United States Patent
Hashigami et al.

(10) Patent No.: US 11,394,874 B2
(45) Date of Patent: Jul. 19, 2022

(54) IMAGING APPARATUS

(71) Applicant: Panasonic Intellectual Property Management Co., Ltd., Osaka (JP)

(72) Inventors: Koji Hashigami, Nara (JP); Koji Shibuno, Osaka (JP); Takaaki Yamasaki, Osaka (JP); Kyosuke Osuka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/181,003

(22) Filed: Feb. 22, 2021

(65) Prior Publication Data
US 2022/0030160 A1    Jan. 27, 2022

(30) Foreign Application Priority Data
Jul. 27, 2020    (JP) .............................. JP2020-126649

(51) Int. Cl.
*H04N 5/232*    (2006.01)
*H04N 5/235*    (2006.01)

(52) U.S. Cl.
CPC ....... *H04N 5/23219* (2013.01); *H04N 5/2352* (2013.01)

(58) Field of Classification Search
CPC .................................................. H04N 5/23219
See application file for complete search history.

(56) References Cited

U.S. PATENT DOCUMENTS

| | | | | |
|---|---|---|---|---|
| 2003/0071908 | A1* | 4/2003 | Sannoh | H04N 5/23218 348/345 |
| 2005/0219395 | A1* | 10/2005 | Sugimoto | H04N 5/235 348/333.12 |
| 2006/0268150 | A1* | 11/2006 | Kameyama | G06K 9/621 348/362 |
| 2008/0007634 | A1* | 1/2008 | Nonaka | H04N 5/2355 348/234 |
| 2008/0024616 | A1 | 1/2008 | Takahashi | |
| 2008/0193119 | A1* | 8/2008 | Miyazaki | G03B 15/05 396/157 |

(Continued)

FOREIGN PATENT DOCUMENTS

| | | |
|---|---|---|
| JP | 2008-035415 A | 2/2008 |
| JP | 2012-103979 A | 5/2012 |
| JP | 2014-216832 A | 11/2014 |

*Primary Examiner* — Twyler L Haskins
*Assistant Examiner* — Dwight Alex C Tejano
(74) *Attorney, Agent, or Firm* — Renner, Otto, Boisselle & Sklar, LLP

(57) ABSTRACT

An imaging apparatus comprises: an imager that captures an image of a subject to generate image data; a first detector that detects a face region corresponding to a face of the subject in the image data; a second detector that detects a subject region corresponding to at least a part of the subject in the image data; and a controller that controls exposure based on metering for the image data, wherein the controller performs, when the face region is detected by the first detector, exposure compensation according to metering in the detected face region, and continues the exposure compensation according to the metering in the detected face region, when the detected face region is lost by the first detector and the subject region corresponding to the subject of the detected face region is detected by the second detector.

15 Claims, 7 Drawing Sheets

(56) References Cited

U.S. PATENT DOCUMENTS

| | | | |
|---|---|---|---|
| 2009/0073287 A1* | 3/2009 | Shimizu | H04N 5/2353 348/234 |
| 2009/0196461 A1* | 8/2009 | Iwamoto | H04N 5/23219 382/103 |
| 2010/0007763 A1* | 1/2010 | Yokohata | H04N 5/2351 348/222.1 |
| 2011/0141316 A1* | 6/2011 | Kubota | G06K 9/2027 348/234 |
| 2012/0121129 A1* | 5/2012 | Okamoto | H04N 5/23219 382/103 |
| 2012/0229678 A1* | 9/2012 | Okamoto | H04N 5/232127 348/239 |
| 2013/0063628 A1* | 3/2013 | Kubota | H04N 5/2351 348/241 |
| 2014/0185875 A1* | 7/2014 | Tsuji | G06V 40/161 382/103 |
| 2021/0306543 A1* | 9/2021 | Kogure | H04N 5/2353 |

* cited by examiner

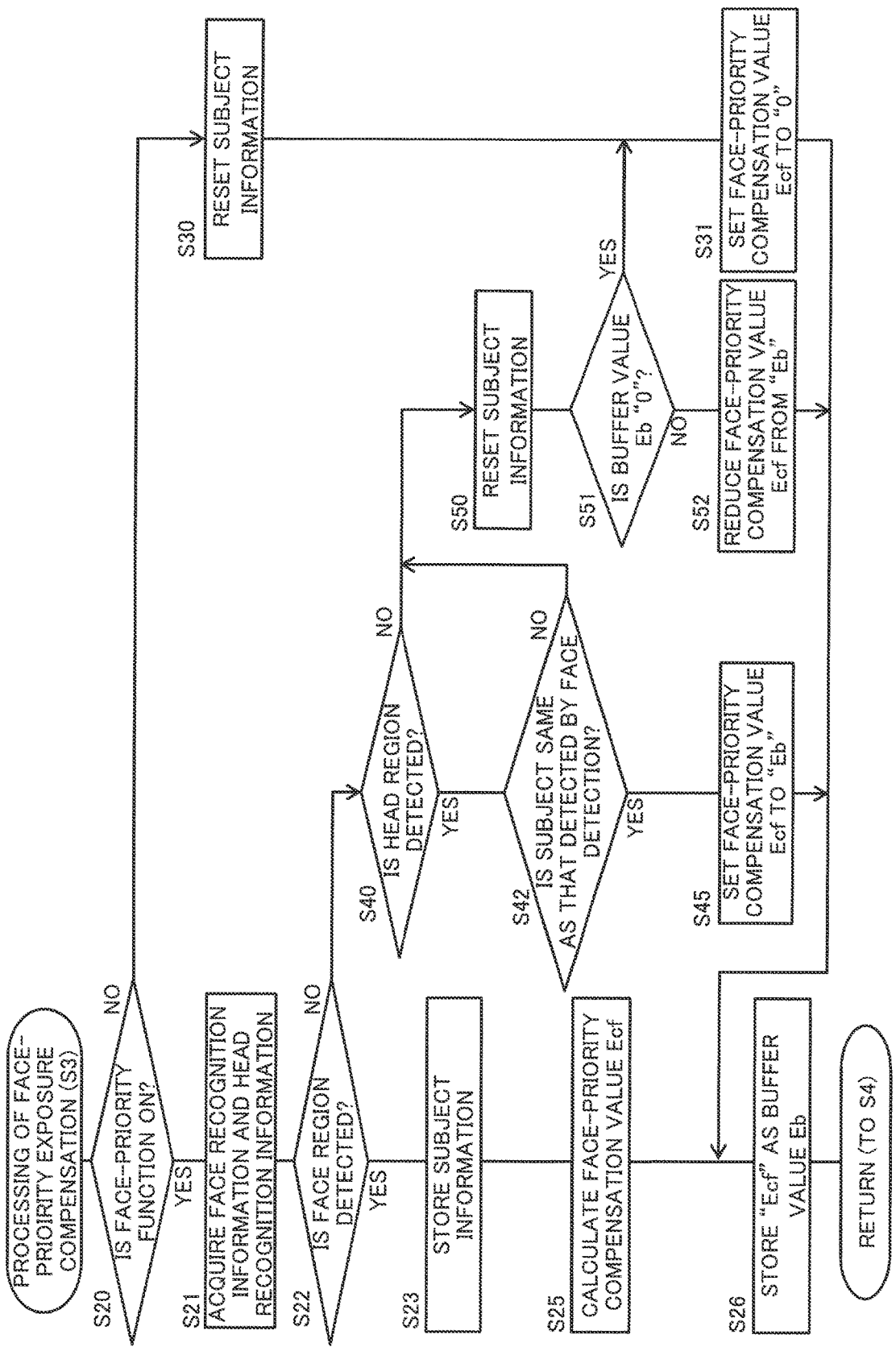

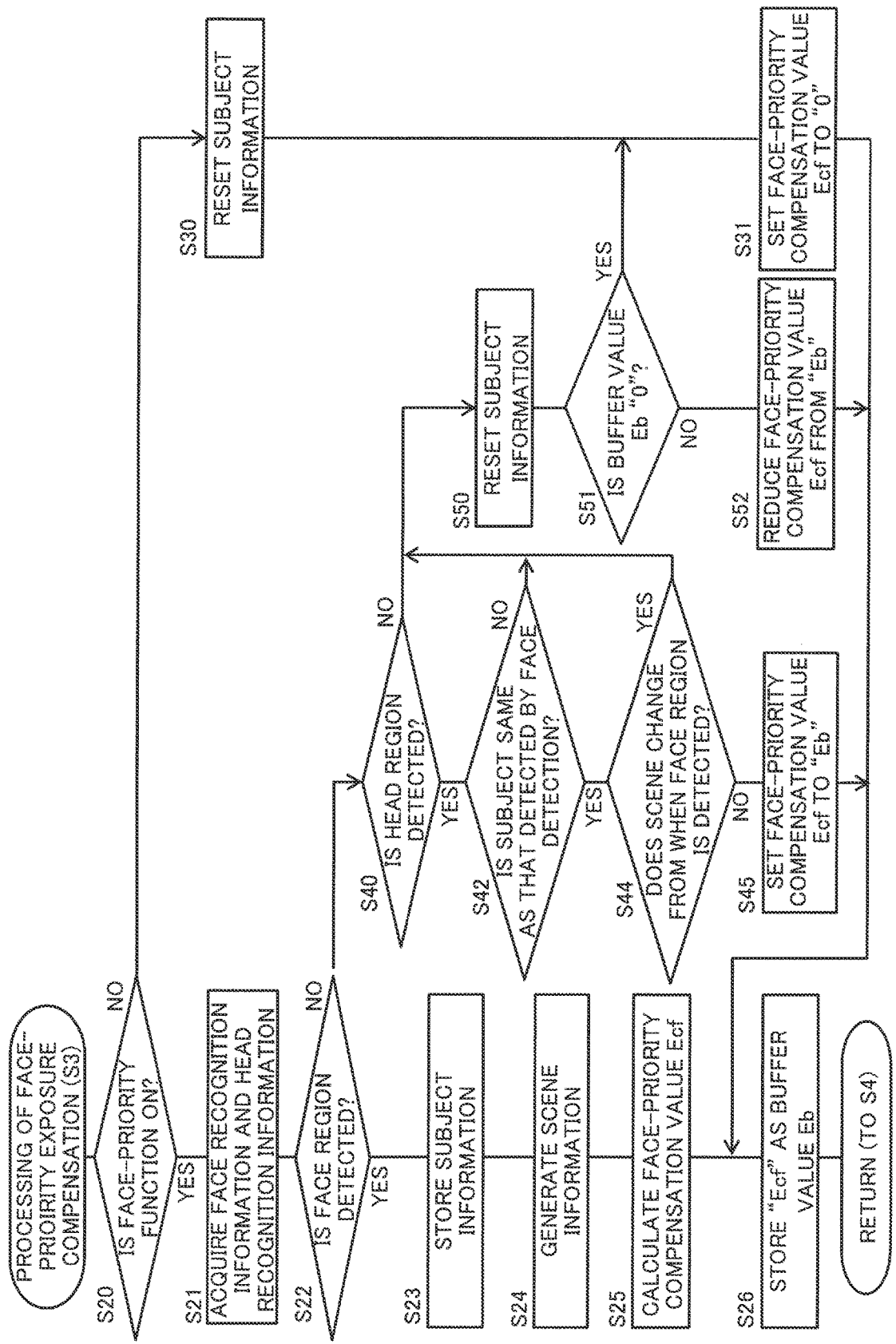

IMAGING APPARATUS

BACKGROUND

1. Technical Field

The present disclosure relates to an imaging apparatus having a function of detecting a subject and controlling exposure.

2. Related Art

JP 2008-35415 A discloses an image sensing apparatus having a function of detecting a specific object from image data by face detection and adjusting exposure to the detected object. Even when face detection fails, the image sensing apparatus of JP 2008-35415 A uses an exposure control value based on information at the time of previous successful face detection for the next image sensing within a predetermined time measured by a timer since the previous successful face detection. As a result, the image sensing apparatus of JP 2008-35415 A prevents a sudden sharp change in exposure even if face detection temporarily fails when the object looks aside or the like.

SUMMARY

The present disclosure provides an imaging apparatus having a function of detecting a subject and controlling exposure, wherein the imaging apparatus is capable of suppressing a fluctuation in exposure.

An imaging apparatus according to one aspect of the present disclosure includes: an imager that captures an image of a subject to generate image data; a first detector that detects a face region corresponding to a face of the subject in the image data; a second detector that detects a subject region corresponding to at least a part of the subject in the image data; and a controller that controls exposure based on metering for the image data. When the face region is detected by the first detector, the controller performs exposure compensation according to metering in the detected face region. When the detected face region is lost by the first detector and the subject region corresponding to the subject of the detected face region is detected by the second detector, the controller continues the exposure compensation according to the metering in the detected face region.

According to the imaging apparatus of the present disclosure, when the face region is lost by the first detector, the exposure compensation according to the metering in the face region is continued when the subject region corresponding to the face region is detected by the second detector. As a result, it is possible to suppress the fluctuation in exposure in the imaging apparatus having the function of detecting the subject and controlling the exposure.

BRIEF DESCRIPTION OF THE DRAWINGS

FIG. 6 is a flowchart illustrating processing of face-priority exposure compensation according to the first embodiment; and FIG. 7 is a flowchart illustrating processing of face-priority exposure compensation according to a second embodiment.

DETAILED DESCRIPTION

Hereinafter, embodiments will be described in detail with reference to the drawings as appropriate. However, detailed descriptions more than necessary will be omitted in some cases. For example, detailed descriptions of already well-known matters and duplicate descriptions for substantially the same configuration will be omitted in some cases. A reason thereof is to avoid unnecessary redundancy of the following description and to facilitate the understanding of those skilled in the art. Note that the inventor(s) provides the accompanying drawings and the following description in order for those skilled in the art to fully understand the present disclosure, and does not intend to limit the subject described in the claims by these.

First Embodiment

In a first embodiment, as an example of an imaging apparatus according to the present disclosure, a digital camera will be described which detects a face and a head of a subject based on an image recognition technique and compensates for exposure based on results of the face detection and head detection.

1. Configuration

Figure 1:
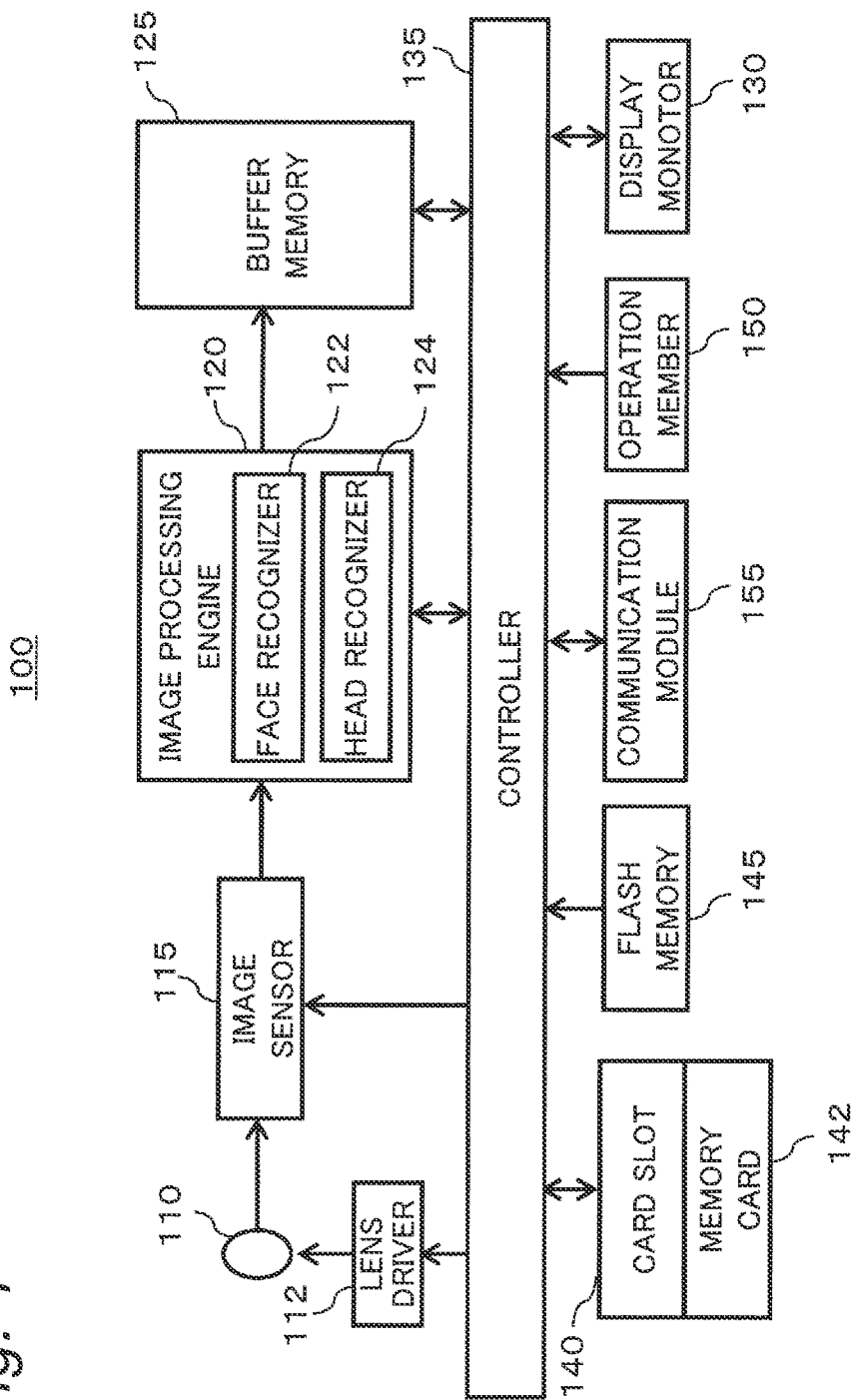
FIG. 1 is a diagram illustrating a configuration of a digital camera according to a first embodiment of the present disclosure.

FIG. 1 is a diagram illustrating a configuration of a digital camera 100 according to the present embodiment. The digital camera 100 of the present embodiment includes an image sensor 115, an image processing engine 120, a display monitor 130, and a controller 135. Further, the digital camera 100 includes a buffer memory 125, a card slot 140, a flash memory 145, an operation member 150, a a communication module 155. In addition, the digital camera 100 includes, for example, an optical system 110 and a lens driver 112.

The optical system 110 includes a focus lens, a zoom lens, an optical image stabilization lens (OIS), an aperture, a shutter, and the like. The focus lens is a lens configured to change a focus state of a subject image formed on the image sensor 115. The zoom lens is a lens configured to change the magnification of the subject image formed by the optical system. Each of the focus lens and the like is configured using one or a plurality of lenses.

The lens driver 112 drives the focus lens and the like in the optical system 110. The lens driver 112 includes a motor and moves the focus lens along an optical axis of the optical system 110 under the control of the controller 135. A configuration for driving the focus lens in the lens driver 112 can be implemented with a DC motor, a stepping motor, a servo motor, an ultrasonic motor, or the like. The lens driver 112 includes an aperture actuator that drives the aperture in the optical system 110 under the control of the controller 135.

The image sensor 115 captures the subject image formed via the optical system 110 to generate imaging data. The imaging data is image data indicating an image captured by the image sensor 115. The image sensor 115 generates image data of a new frame at a predetermined frame rate (e.g., 30 frames/second). The generation timing of imaging data and an electronic shutter operation of the image sensor 115 are controlled by the controller 135. As the image sensor 115, various image sensors, such as a CMOS image sensor, a CCD image sensor, and an NMOS image sensor, can be used.

The image sensor 115 performs an operation of capturing a moving image, a still image, a through image, or the like. The through image is mainly a moving image, and is displayed on the display monitor 130 to allow a user to determine a composition for capturing a still image, for example. The image sensor 115 performs various operations such as exposure and electronic shutter. The image sensor 115 is an example of an imager in the present embodiment.

The image processing engine 120 performs various types of processing on imaging data output from the image sensor 115 to generate image data or performs various types of processing on image data to generate an image to be displayed on the display monitor 130. Examples of the various types of processing include white balance correction, gamma correction, YC conversion processing, electronic zoom processing, compression processing, decompression processing, and the like, but are not limited thereto. The image processing engine 120 may be configured using a hard-wired electronic circuit, or may be configured using a microcomputer, a processor, or the like using a program.

In the present embodiment, the image processing engine 120 includes a face recognizer 122 and a head recognizer 124 that realize a detection function of a subject such as a human face and a head by image recognition of a captured image. The face recognizer 122 and the head recognizer 124 are examples of a first detector and a second detector in the present embodiment, respectively.

The face recognizer 122 performs face detection by, for example, rule-based image recognition processing such as template matching. The face detection may be performed by various image recognition algorithms. For example, a feature value-based method focusing on a local region of a face such as eyes and mouth can be used. The face recognizer 122 recognizes a face region indicating a region in which the face appears in a captured image. The face recognizer 122 generates face recognition information based on a detection result of the face region and outputs the generated face recognition information to the controller 135, for example.

The head recognizer 124 detects a head using a learned model by a neural network such as a convolutional neural network, for example. The head recognizer 124 recognizes a head region indicating a region in which the head appears in a captured image. The head recognizer 124 generates head recognition information based on a detection result of the head region and outputs the generated head recognition information to the controller 135, for example.

The learned model of the head recognizer 124 can obtained by supervised learning using image data associated with a grand truth label as training data, for example. The grand truth corresponds to images showing the head in all directions including the profile and back of the head. The learned model may generate reliability or likelihood regarding a detection result. The learned model of the head recognizer 124 is not limited to the neural network, and may be a machine learning model related to various types of image recognition.

The face recognition information output by the face recognizer 122 and the head recognition information output by the head recognizer 124 include, for example, positions, sizes, feature values, and the like of the face region and the head region in the captured image, respectively. For example, the feature value may be color information such as an RGB histogram, a Haar-like feature value, a HOG feature value, and/or a feature value extracted by a part of the learned model in the head recognizer 124 functioning as a feature extractor. When face regions and head regions corresponding to a plurality of subjects are detected, the face recognition information and the head recognition information may include information such as a subject ID that associates a face region and a head region with a subject, respectively.

The face recognizer 122 and the head recognizer 124 may be configured separately from the image processing engine 120, or may be integrally configured with the controller 135. In addition, the face recognizer 122 and the head recognizer 124 may detect not only a human but also an animal as a subject.

The display monitor 130 is an example of display that displays various types of information. For example, the display monitor 130 displays an image (through image) indicated by image data which is captured by the image sensor 115 and subjected to image processing by the image processing engine 120. In addition, the display monitor 130 displays a menu screen or the like for a user to make various settings for the digital camera 100. The display monitor 130 can be configured using a liquid crystal display device or an organic EL device, for example.

The operation member 150 is a general term for hard keys and soft keys, such as an operation button and an operation dial provided on the exterior of the digital camera 100, and receives a user operation. For example, the operation member 150 includes a release button, a mode dial, a touch panel of the display monitor 130, a joystick, and the like. When receiving the user operation, the operation member 150 transmits an operation signal corresponding to the user operation to the controller 135.

The controller 135 is a hardware controller and controls the operation of the entire digital camera 100 overall. The controller 135 includes a CPU and the like, and the CPU realizes a predetermined function by executing a program (software). The controller 135 may, in place of the CPU, include a processor configured using a dedicated electronic circuit designed to realize a predetermined function. That is, the controller 135 can be implemented with various processors such as a CPU, an MPU, a CPU, a DSU, an FPGA, and an ASIC. The controller 135 may configured using one or a plurality of processors. In addition, the controller 135 may be configured using one semiconductor chip together with the image processing engine 120 and the like.

The controller 135 performs, for example, auto-focus control (AF control) and auto-exposure control (AE control). The controller 135 adjust the exposure in the exposure control by changing an aperture value, a shutter speed, and an ISO sensitivity, for example.

The buffer memory 125 is a recording medium that functions as a work memory for the image processing engine 120 and the controller 135. The buffer memory 125 is realized by a dynamic random access memory (DRAM) or the like. The flash memory 145 is a non-volatile recording medium. For example, the buffer memory 125 stores an exposure compensation value and its buffer value, subject information, scene information, various types of setting information in the digital camera 100, and the like which will be described later. Each of the memories 125 and 145 is an example of a storage unit in the present embodiment.

Although not illustrated, the controller 135 may have various internal memories, for example, includes a built-in ROM. Various programs executed by the controller 135 are stored in the ROM. The controller 135 may include a RAM that functions as a work area of the CPU. The various memories are also examples of the storage in the present embodiment.

The card slot 140 is a means for inserting a removable memory card 142. The card slot 140 enables electrical and mechanical connection with the memory card 142. The memory card 142 is an external memory having a recording element such as a flash memory inside. The memory card 142 can store data such as image data generated by the image processing engine 120.

The communication module 155 is a communication module (circuit) that performs communication according to the communication standard IEEE 802.11, standard, or the like. The digital camera 100 can communicate with another device via the communication module 155. The digital camera 100 may directly communicate with another device via the communication module 155, or may communicate via an access point. The communication module 155 may be connectable to a communication network such as the Internet.

1-1. Setting Menu

The digital camera 100 of the present embodiment is configured such that a user can set whether to use face recognition for AE control in a setting menu or the like. A configuration example of the setting menu of the digital caller. 100 will be described with reference to FIG. 2.

Figure 2:
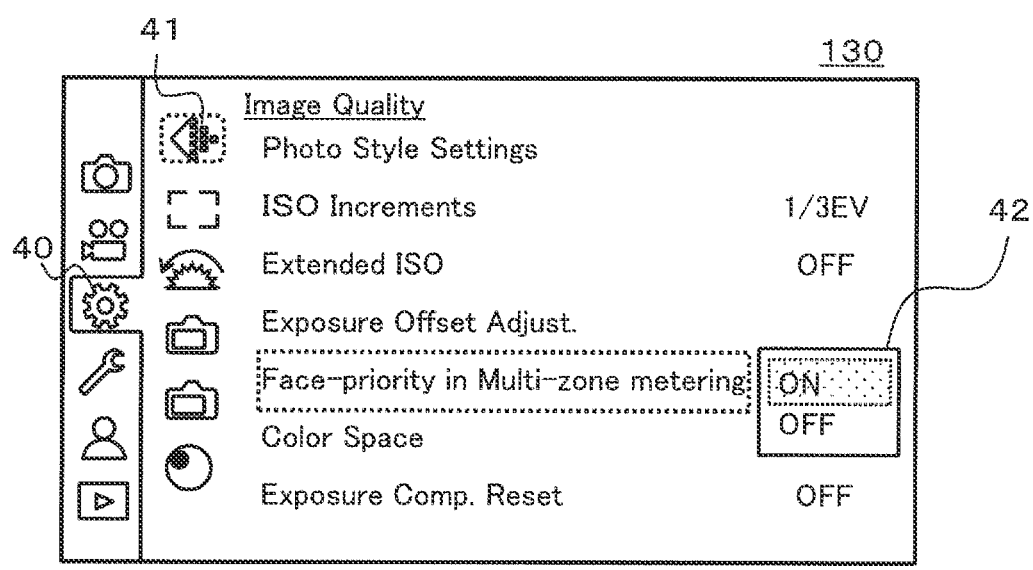
FIG. 2 is a view illustrating a display example of a setting menu screen in the digital camera.

FIG. 2 illustrates a display example of a setting menu screen in the digital camera 100. This display example illustrates a state where a tab 40 is selected. The tab 40 is provided for displaying a custom setting menu for setting various types of information related to the digital camera 100. The custom setting menu is provided with an icon 41 to display a menu item related to image quality, and the icon 41 is selected in this display example. As one of the menu items displayed on the display monitor 130 in this case, a menu item "face-priority in multi-zone metering" is provided in the digital camera 100 of the present embodiment.

In the present embodiment, the menu item of "face-priority in multi-zone metering" is provided such that the user can set on/off for activation/deactivation of an option of a face-priority function in a multi-zone metering mode. FIG. 2 illustrates a state where the menu item of "face-priority in multi-zone metering" is selected by the user operation on the operation member 150. The operation member 150 is operable to receive a user operation for selecting a menu item using a touch panel of the display monitor 130 or an operation button such as a joystick, for example.

The multi-zone metering mode is an AE control operation mode operable to determine exposure on the basis of metering (hereinafter referred to as "multi-zone metering") that divides a captured image such as a through image into a plurality of areas and evaluates the luminance (an example of brightness) of the entire imaging data based on the brightness of each area of the divided areas. In addition to the multi-zone metering mode, the operation mode of AE control includes a center-weighted metering mode and a spot metering mode, for example. The center-weighted metering mode is operable to determine exposure based on metering with a large weigh set in a center area of a captured image. The spot metering mode is operable to determine exposure based on metering a preset specific area in a captured image. The digital camera 100 includes a menu item with which the user can set such an operation mode of AE control in the setting menu, for example.

The face-priority function is a function for compensating for exposure such that a face region of a subject has an appropriate brightness based on a detection result of the face recognizer 122 when the digital camera 100 is set to the multi-zone metering mode. According to the face-priority function, the brightness of the face region is evaluated in preference to the luminance of the surroundings, resulting in compensating for the exposure determined based on the luminance of the entire captured image in the multi-zone metering mode.

As illustrated in FIG. 2, when the menu item "face-priority in multi-zone metering" is selected, a selection window 42 in which the user can select activation/deactivation of the face-priority function by ON/OFF is displayed as a pop-up, for example. The digital camera 100 of the present embodiment is configured to set whether to compensate for the exposure by the face-priority function in the AE control of the multi-zone metering mode in response to the operation in which the user selects ON/OFF of the selection window 42 by the operation member 150.

2. Operation

An operation of the digital camera 100 configured as described above will be described hereinafter.

2-1. Outline of Operation

An outline of an AE control operation when the face-priority function in the multi-zone metering mode of the digital camera 100 of the present embodiment is activated will be described with reference to FIGS. 3A and 3B.

Figure 3A:
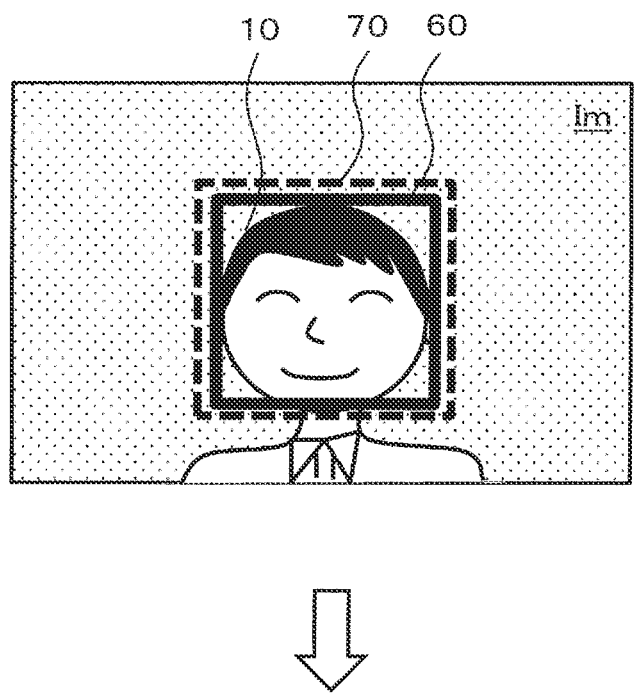
FIGS. 3A and 3B are views for describing an AE control operation of the digital camera.
Figure 3B:
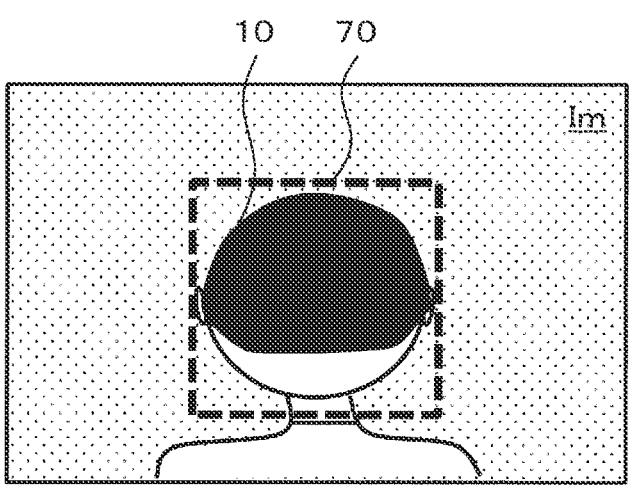

FIGS. 3A and 3B are views for describing an exposure control operation of the digital camera 100. FIG. 3A illustrates an example of a captured image Im showing a face of a person 10 who is a subject. In the digital camera 100 of the present embodiment, the face recognizer 122 and the head recognizer 124 respectively perform face detection and head detection in parallel, based on the captured image Im. As a result, a face region 60 and a head region 70 of the person 10 are detected in the captured image Im illustrated in FIG. 3A.

In the example of FIG. 3A, the brightness of the person 10 and the brightness of the background in the captured image Im are different from each other. In the multi-zone metering mode, the digital camera 100 determines exposure by multi-zone metering that evaluates the luminance of the entire area of the captured image Im including the background and the like. Further, according to the face-priority function, the digital camera 100 compensate for the exposure by multi-zone metering, based on the luminance of the face region 60. With such AE control, it is possible to obtain the captured image Im with the exposure such that the face of the person 10 as the subject is captured with an appropriate brightness.

FIG. 3B illustrates the captured image Im in which the face of the person 10 is no longer shown after FIG. 3A. In such a case, it becomes unable for the face recognizer 122 to detect the face region 60, that is, face detection is lost. In the AE control in such a case, it is conceivable that the exposure obtained by evaluating the luminance of the entire captured image Im by multi-zone metering is not compensated for by the face-priority function. In this case, flickering fluctuation would be caused in the exposure of the captured image Im before and after the loss of face detection, and the exposure by the AE control is not stable.

In the present embodiment, even when the face region 60 of the person 10 is lost, the digital camera 100 uses the head detection by the head recognizer 124 to continue the exposure compensation based on the face region 60 as long as the head region 70 determined to be the same person 10 is detected. As a result, when the person 10 is shown in the captured image Im with presence or absence of the face varying as illustrated in FIGS. 3A and 3B, the fluctuation of the exposure by the AE control is suppressed. Thus, it is possible to stabilize the exposure of the captured image Im in the face-priority function in multi-zone metering. Details of the operation of the digital camera 100 as described above will be described hereinafter.

2-2. AE Control Processing

Figure 4:
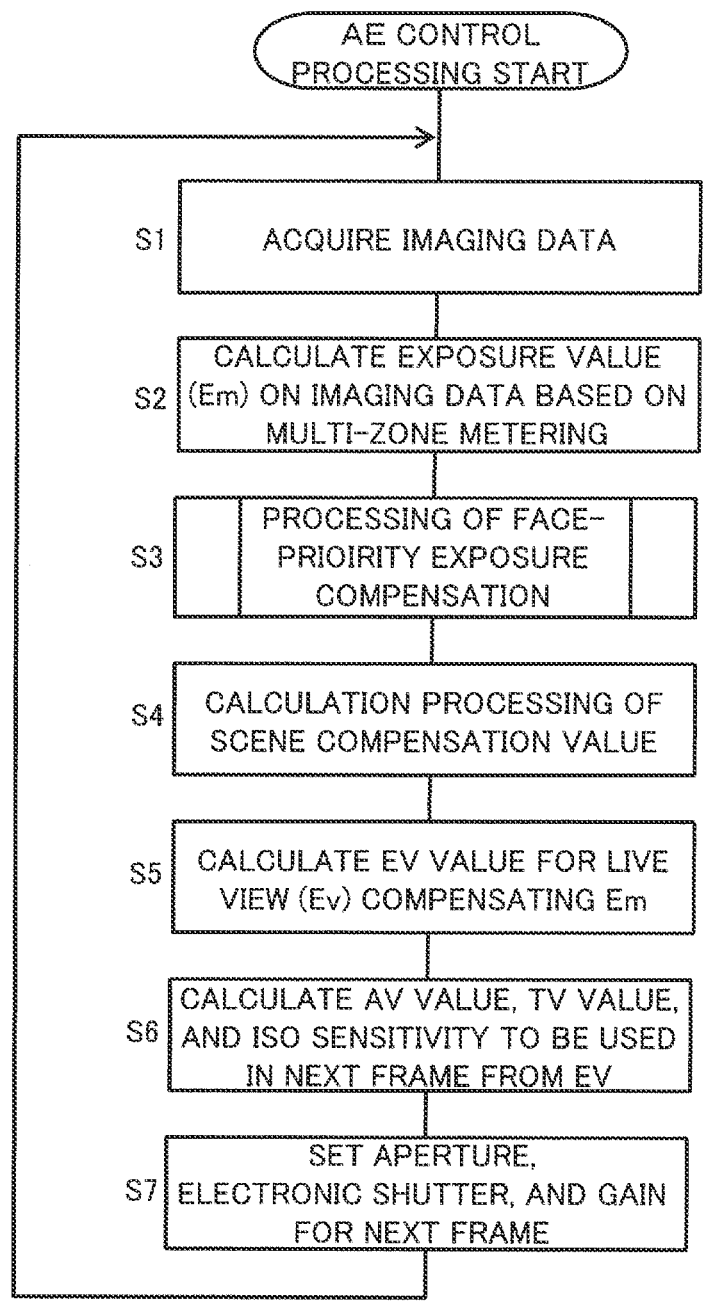
FIG. 4 is a flowchart illustrating AE control processing in the digital camera.

An operation example of AE control for live view in the digital camera 100 of the present embodiment will be described with reference to FIG. 4. FIG. 4 is a flowchart illustrating AE control processing in the present embodiment.

The processing illustrated in FIG. 4 is repeatedly performed by the controller 135 at a predetermined period (e.g., a frame period) in synchronization with the operation of each of the recognizers 122 and 124, for example. The processing illustrated in FIG. 4 is started in a state where the digital camera 100 is set to the multi-zone metering mode and the captured image Im as a through image of the live view (FIGS. 3A and 3B) is displayed.

First, the controller 135 acquires imaging data output from the image sensor 115 for each frame (S1). The imaging data includes information indicating the luminance of each pixel, for example.

Next, the controller 135 calculates an exposure value Em by multi-zone metering based on the luminance of the entire image indicated by the imaging data (S2). The exposure value (hereinafter referred to as "EV value") is used in the AE control to control the exposure by setting an aperture, an electronic shutter, and a gain that amplifies the output of the image sensor 115.

Figure 5:
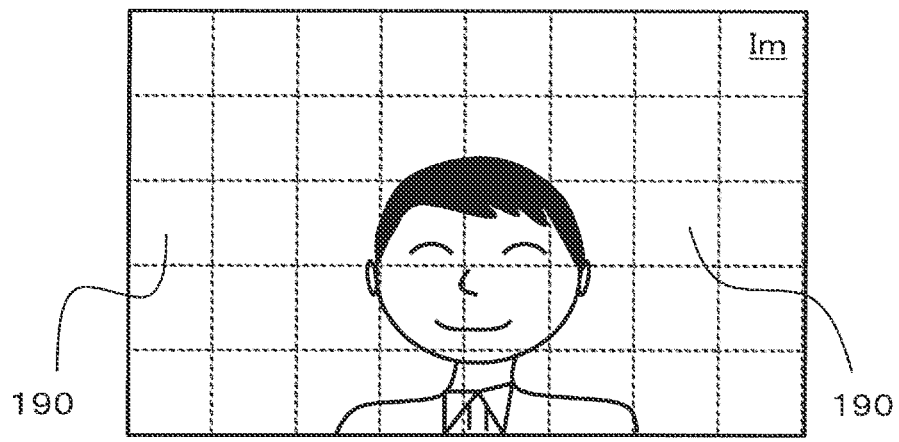
FIG. 5 is a view for describing a multi-zone metering mode.

FIG. 5 is a view for describing the multi-zone metering mode. The controller 135 acquires a luminance of each of areas 190 obtained by dividing the captured image Im into a plurality of areas. Then the controller 135 calculates an average value obtained by multiplying the luminance of each of the areas 190 by a weight set for each of the areas 190 in the multi-zone metering mode. In this way, the controller 135 calculates the EV value Em by the multi-zone metering based on the weighted average of the luminance of the captured image Im. The luminance of each of the areas 190 is acquired an average value of the luminance of each pixel included in each of the areas 190, for example.

Referring back to FIG. 4, the controller 135 performs processing of face-priority exposure compensation (S3) to calculate an exposure compensation value (hereinafter referred to as "face-priority compensation valuer") Ecf which as used in the face-priority function to compensate for the EV value Em by multi-zone metering. In Step S3 of the present embodiment, the face-priority compensation value Ecf calculated when the face region 60 is detected as illustrated in FIG. 3A, is held as long as the head region 70 is detected illustrated in FIG. 3B even when the face detection is lost, for example. In the present embodiment, when not only the face region 60 but also the head region 70 is not detected, the controller 135 gradually reduces the held face-priority compensation value Ecf. Details of the processing of face-priority exposure compensation (S3) will be described later.

The controller 135 performs scene determination determine a condition related to imaging in the digital camera 100, such as exposure according to an image shooting condition, and calculates an exposure compensation value (hereinafter referred to as "scene compensation value") Ecs based on the scene determination (S4). The scene determination includes cloudiness determination, backlight determination, halation determination, and night view determination, for example.

The cloudiness determination is determination to perform compensation to brighten a captured image, considering that underexposure is likely to occur in the case of cloudy weather. The backlight determination is determination to perform compensation to brighten a subject, considering that the subject is likely to be dark at the backlight. The halation determination is determination to perform compensation to darken a captured image identifying a light source that is likely to overexpose. The night view determination is determination to perform compensation to darken a captured image, considering that overexposure is likely to occur when capturing a night view.

In calculation processing of the scene compensation value (S4), the controller 135 calculates an exposure compensation value according to a results of each scene determination from the luminance distribution in the imaging data, for example. The scene compensation value Ecs is hereinafter defined as the sum of the respective exposure compensation values.

The controller 135 calculates an EV value Ev for live view by compensation calculation that reflects the face-priority compensation value Ecf and the scene compensation value Ecs in the EV value Em by the multi-zone metering (S5). For example, the compensation calculation is performed by adding the respective compensation values Ecf and Ecs to the EV value Em before compensation.

Next, the controller 135 calculates an AV value, a TV value, and an ISO sensitivity to be used in the next frame from the EV value Ev for live view (S6). The AV value, TV value, and ISO sensitivity are control values corresponding to the aperture value, shutter speed, and gain respectively. For example, these control values are calculated based on a program diagram that defines a combination of control values according to the EV value. The program diagram is stored in advance in an internal memory of the controller 135, for example.

The controller sets, an aperture, an electronic shutter, and a gain to control the exposure of the next frame based on the calculated AV value, TV value, and ISO sensitivity (S7). Then, the controller 135 performs an imaging operation, and repeats processes of Step S1 and the subsequent steps.

According to the above AE control processing, exposure compensation is performed on the EV value Em calculated by the multi-zone metering (S2), using face-priority compensation value Ecf (S3) and the scene compensation value Ecs (S4). As a result, the EV value Ev for live view is obtained (S5).

2-3. Processing of Face-Priority Exposure Compensation

FIG. 6 is a flowchart illustrating the processing of face-priority exposure compensation (S3) in the present embodiment. The processing according to the flowchart illustrated in FIG. 6 started after the calculation of the EV value Em by multi-zone metering (S2) for a current frame acquired in Step S1 of FIG. 4.

First, the controller 135 determines whether the face-priority function in the multi-zone metering mode is set to ON (S20). For example, the controller 135 stores ON or OFF of the function as setting information in the buffer memory 125 or the like in advance. The ON or OFF is selected via the operation member 150 in the user operation on the setting menu illustrated in FIG. 2. In Step S20, the controller 135 determines ON/OFF of the face-priority function referring to the above setting information.

When the face-priority function is ON (YES in S20), the controller 135 acquires, from the face recognizer 122, face recognition information generated on the current frame as a processing target (S21). Similarly, the controller 135 acquires head recognition information of the current frame from the head recognizer 124 (S21). In the example of FIG. 3A, the face recognition information including the face region 60 and head recognition information including the head region 70 are acquired (S21).

Next, the controller 135 determines whether the face region is detected based on the acquired face recognition information (S22). For example, reflecting the situation that the face region 60 of the person 10 is detected in the example of FIG. 3A, the controller 135 proceeds to YES in Step S22. On the other hand, reflecting the situation that the face region 60 is not detected in the example of FIG. 3S, the controller 135 proceeds to NO in Step S22.

When the face region is detected (YES in S22), the controller 135 stores subject information indicating a subject corresponding to the detected face region in the buffer memory 125, for example (S23). The subject information is based on the face recognition information and head recognition information, and includes various feature values of the image in the face region and head region, for example.

In the example of FIG. 3A, the subject information based on the face region 60 and the head region 70 of the same person 10 is stored (S23). For example, the controller 135 manages the correspondence relationship between the detected face region and head region in each subject information based on the positional relationship on the image of each frame. The subject information may be based on either the face region or the head region.

Next, the controller 135 calculates the face-priority compensation value Ecf based on the information indicating the brightness such as the luminance of the face region detected in the acquired imaging data (S25). In the example of FIG. 3A, the face-priority compensation value Ecf is calculated according to a difference in the luminance of the face region 60 from the entire captured image Im or the background. The calculated face-priority compensation value Ecf is stored in a storage area provided in the buffer memory 125 for use in the compensation for the EV value Em which is based on multi-zone metering (S5 in FIG. 4), for example.

Further, the controller 135 stores a current value of the calculated face-priority compensation value Ecf as a buffer value Eb in the buffer memory 125, for example (S26). The buffer value Eb is used to refer to a past face-priority compensation value when repeating the processing of face-priority exposure compensation (S3). For example, the above storage area may be served for the buffer value Eb.

After storing the current face-priority compensation value Ecf (S26), the controller 135 ends the processing of face-priority exposure compensation (S3) for the current frame, and proceeds to Step S4 in FIG. 4. Thereafter, the flow of FIG. 4 is repeated to perform the processing of face-priority exposure compensation (S3) for the next frame.

When the face-priority function is OFF (NO in S20), the controller 135 resets the subject information in the buffer memory 125, for example (S30). Then the controller 135 sets the face-priority compensation value Ecf to "0" regardless of the result of face detection (S31), and proceeds to Step S26. According to the resetting, the subject information is set to an initial value indicating that no subject is detected, for example.

When no face region is detected (NO in S22), the controller 135 determines whether the head region is detected based on the head recognition information acquired in Step S21 (S40). For example, in the example of FIG. 3B showing transition from FIG. 3A, the face region 60 of the person 10 is lost (NO in S22) while the head region 70 is detected. In this case, the controller 135 proceeds to YES in Step S40.

When the head region is detected (YES in S40), the controller 135 determines whether a subject corresponding to the most recently detected face region and a subject corresponding to the currently detected head region are the same based on the stored subject information (S42). For example, the processing of Step S42 is performed by comparing a feature value of the head region included in the subject information and a feature value of the head region included in the head recognition information for the current frame.

For example, the controller 135 compares the head regions 70 in FIGS. 3A and 3B to determine that the person 10 of the head region 70 detected in the example of FIG. 3B is the same subject as the person 10 of the face region 60 that is lost (YES in S42). The determination in Step S42 can be realized using a classifier that is learned in advance to identify the same person based on head images of the person in various face orientations by various machine learning methods, for example.

When determining that the subject indicated by the subject information and the subject corresponding to the currently detected head region are the same (YES in S42), the controller 135 sets the face-priority compensation value Ecf at the current time to the same value as the stored buffer value Eb (S45). As a result, the face-priority compensation value Ecf in the example of FIG. 3B is set to the exposure compensation value which is calculated at the time of FIG. 3A with the face region 60 detected (S25) and stored as the buffer value Eb (S26). In this manner, even when the face region 60 is no longer detected, the face-priority compensation value Ecf at the time when the face region 60 is detected, is held under the condition that the head region 70 of the subject same as the face region 60 is detected.

The controller 135 stores the face-priority compensation value Ecf set as described above as the buffer value Eb for reference in the next and subsequent processing of face-priority exposure compensation (S26).

Meanwhile, when no head region is detected (NO in S40), the controller 135 resets the subject information stored in the buffer memory 125, for example (S50). Even when determining that the subject indicated by the subject information and the subject corresponding to the detected head region are not the same (NO in S42), the controller 135 performs the resetting in Step S50. When the determination in Step S42 is performed based on the reset subject information, the determination result is NO.

The processes of Step S50 and the subsequent steps are processing to gradually reduce holding of the face-priority compensation value Ecf. For example, the controller 135 determines whether the stored buffer value Eb is "0" (S51). The buffer value Eb at this time indicates the previous face-priority compensation value Ecf in Step S26.

When determining that the buffer value Eb is not "0" (NO in S51), the controller 135 sets a current face-priority compensation value Ecf so as to reduce the magnitude from the buffer value Eb (i.e., the previous face-priority compensation value Ecf) (S52).

For example, the controller 135 once sets a new face-priority compensation value Ecf to the same value as the buffer value Eb, and then, performs an operation of reducing the magnitude from the set value by a predetermined value (S52). The predetermined value is, from the viewpoint of avoiding a sudden change in exposure, set in advance as a pitch that gradually brings the face-priority compensation value Ecf closer to "0" by repeating Step S52. The predetermined value may be set depending on the magnitude of the face-priority compensation value Ecf of when the processing proceeds Step S50 for the first time after the loss of face detection, considering the length of time until the face-priority compensation value Ecf reaches "0".

When determining that the buffer value Eb is "0" (YES in S51), the controller 135 sets the current face-priority compensation value Ecf to "0" (S31). After setting the face-priority compensation value Ecf in Steps S52 or S31, the controller 135 stores the same value as the current face-priority compensation value Ecf as the buffer value Eb (S26), and ends the processing of face-priority exposure compensation (S3 in FIG. 4).

According to the above processing of face-priority exposure compensation (S3), when the face region is detected (YES in S22), the face-priority compensation value Ecf to compensate for the exposure according to the brightness of the face region is calculated (S25). Even when the face region is no longer detected (NO in S22), the face-priority compensation value Ecf based on the luminance of the face region is held (S45) under the condition that the head region corresponding to the subject same as the most recently detected face region is detected (YES in S40 and S42). As a result, even when the face orientation and posture of the subject change so that the face detection is lost, the AE control processing (FIG. 4) is performed using the held face-priority compensation value Ecf as long as the head of the subject appears in the captured image Im. According to that, it is possible to suppress the frequent switching of the presence/absence of compensation based on the face-priority function caused by the movement of the subject, and to stabilize the exposure, for example.

Further, when not only the face region but also the head region is lost (NO in S40), the held face-priority compensation value Ecf is gradually reduced (S52). As a result, it is possible to suppress a sudden change in exposure even when the face and head of the subject do not appear in the captured image Im, for example.

3. Effects and the Like

As described above, the digital camera 100 of the present embodiment includes: the image sensor 115 (an example of an imager) that captures an image of a subject to generate image data; the face recognizer 122 (an example of an first detector) that detects a face region corresponding to a face of the subject in the image data; the head recognizer 124 (an example of an second detector) that detects a subject region corresponding to at least a part of the subject in the image data; and the controller 135 (an example of an controller) that controls exposure based on metering related to the image data. When the face region is detected by the face recognizer 122 (YES in S22), the controller 135 performs exposure compensation according to the metering to the detected face region (S25, S5). When the face region is lost by the face recognizer 122 (NO in S22) and the subject region corresponding to the subject in the detected face region is detected by the head recognizer 124 (YES in S40), the controller 135 continues the exposure compensation according to the metering in the detected face region (S45).

According to the above digital camera 100, in the AE control, the exposure compensation at the time when the face region is detected is continued in the case that the face region is lost but the head region corresponding to the subject in the face region is detected. As a result, it is possible to suppress the fluctuation in exposure due to the AE control when the face region is detected in some cases or is not detected in other cases resulting from the change of the face orientation of the subject or the like.

In the present embodiment, the head recognizer 124 detects the region, as the subject region, corresponding to the head of the subject. As a result, even when the person who is the subject appears in the captured image Im but the face does not appear, it is possible to suppress the fluctuation in exposure due to the AE control in the case that the head appears.

The digital camera 100 of the present embodiment further includes the setting menu (an example of a setting interface) that allows activate or deactivate of the face-priority function (an example of an option valuing the face region preferentially) in the operation mode regarding metering. When the function is activated in the setting menu, the controller 135 performs the exposure compensation according to the metering in the detected face region (S20, S3). As a result, it is possible to set whether to compensate for the exposure based on the face-priority function according to the user's intention.

When the face region is lost (NO in S22) and the corresponding subject region is not detected by the head recognizer 124 (NO in S40 or S42) after the face region is detected by the face recognizer 122 (YES in S22), the controller 135 gradually reduces the exposure compensation according to the metering in the detected face region (S50 to S52). As a result, when not only the face region hut also the head region is not detected, the amount of exposure compensation based on the face-priority compensation value Ecf is gradually reduced. Therefore it is possible to suppress the sudden changes in exposure due to the AE control and to stabilize the exposure.

The digital camera 100 of the present embodiment further includes the buffer memory 125 and the flash memory 145 (examples of a storage) that store information. When the face region is detected by the face recognizer 122, the controller 135 calculates the face-priority compensation value Ecf (an example of an exposure compensation value) to perform the exposure compensation according to the metering in the detected face region (S25), stores the calculated face-priority compensation value Ecf in the buffer memory 125 as the buffer value Eb (S26). When the face region is lost by the face recognizer 122 (NO in S22) and the head region corresponding to the subject in the detected face region is detected by the head recognizer 124 (YES in S40 and S42), the controller 135 holds the face-priority compensation value Ecf stored in the buffer memory 125 to continue the exposure compensation (S45). As a result, when the face-priority exposure compensation processing (S3) is repeated, the past face-priority compensation value Ecf can be referred to and used to continue the compensation.

In the present embodiment, the controller 135 stores the subject information in the storage (S23) when the face region is detected by the face recognizer 122 (YES in S22). The subject information indicates the subject based on at least one of the face region and the subject region. The controller 135 determine whether to hold the stored face-priority compensation value Ecf, referring to the stored subject information (S42), when the face region is lost by the face recognizer 122 and the head region is detected by the head recognizer 124 (YES in S40). As a result, the face-priority compensation value Ecf can be held when the subject corresponding to the previously detected face region and the subject corresponding to the subsequently detected head region are the same.

Second Embodiment

Hereinafter, a second embodiment of the present disclosure will be described with reference to FIG. 7. In the first embodiment, the description is given regarding the digital camera 100 that holds the face-priority compensation value Ecf in the AE control as long as the head region is detected when the face detection is lost in the middle of image shooting. In the second embodiment, a description will be given regarding the digital camera 100 that does not hold the face-priority compensation value Ecf when the brightness of a scene (i.e., the entire image) changes significantly.

Hereinafter, the digital camera 100 according to the present embodiment will be described omitting as appropriate the description of the configurations and operations similar to those or the digital camera 100 according to the first embodiment.

FIG. 7 is a flowchart illustrating processing of face-priority exposure compensation in the second embodiment. The digital camera 100 of the present embodiment is configured similarly to that in the first embodiment, and performs the similar AE control processing as in FIG. 4, for example. In Step S3 in this case, as illustrated in FIG. 7, the controller 135 of the digital camera 100 in the present embodiment performs steps S20 to S52 (FIG. 6) similar to those in the first embodiment, and further performs processing (S24, S44) in consideration of the brightness of the scene.

Specifically, when a face region is detected (YES in S22), the controller 135 generates scene information indicating the brightness of the captured image Im based on current imaging data (S24), in addition to generating the subject information (S23). The scene information is calculated as an EV value based on an average value of the luminance over the entire captured image Im, for example. The controller 135 stores the calculated scene information in the buffer memory 125, for example.

When face detection is lost (NO in S22), the controller 135 determines whether the current scene information changes from the scene information before the loss of face detection (S44), under the condition that a head region of the subject same as the subject information stored before the loss is detected (YES in S40, S42), for example. For example, the controller 135 calculates the scene information in a current frame in the same manner as described above, and determines that the scene information is not changed (NO in S44) when a difference between the current scene information and the stored scene information is within a predetermined range. The predetermined range is defined by the amount of change in the EV value (e.g., less than ±2 in the EV value), from the viewpoint of defining a range considered as a variation in brightness in which the proper exposure does not change between frames, for example.

When determining that the scene information is not changed (NO in S44), the controller 135 holds the face-priority compensation value Ecf in the buffer value Eb as in the first embodiment (S45). On the other hand, when determining that the scene information is changed (YES in S44), the controller 135 resets the subject information and scene information (S50), as in the case where no head region is detected (NO in S40) or the case where the subject in the head region is not the same as that at the time of the loss of face detection (NO in S42). As a result, the face-priority compensation value Ecf is gradually reduced by the processing of Step S51 and the subsequent steps as in the first embodiment.

For example, when the brightness of the scene changes significantly after the face detection of the person 10 is lost, it would be difficult to properly compensate for exposure with the face-priority compensation value Ecf before the loss of face detection, even under the condition that a face region of the person 10 same as the lost face region is detected again thereafter. Therefore, according to the processing of face-priority exposure compensation in the present embodiment, it is possible to discard the held face-priority compensation value Ecf or the like depending on the change in the brightness of the scene (YES in S44). This facilitates obtaining the captured image Im with appropriate exposure.

The controller 135 stores the scene information in the buffer memory 125 (S24) when the face region is detected by the face recognizer 122 (YES in S22). The scene information indicates the fitness of the scene in the image data. The controller 135 determines whether to hold the face-priority compensation value Ecf stored as the buffer value Eb, referring to the stored scene information (S44), when the face region is lost by the face recognizer 122 (NO in S22). As a result, when the brightness of the scene significantly changes in the case that the face detection is lost, the face-priority compensation value Ecf is not held, so that the improper exposure compensation can be suppressed.

Other Embodiments

As described above, the first embodiment and the second embodiment are described as examples of the technique disclosed in this application. However, the technique of the present disclosure is not limited thereto, and is also applicable to embodiments obtained by appropriately performing changes, replacements, additions, omissions, and the like. In addition, it is possible to combine the respective constituent elements described in the above-described embodiments to obtain a new embodiment.

In each of the above embodiments, the example (S5) of applying, in the AE control processing (FIG. 4), the compensation by the face-priority function to the EV value Ev for live view is described. In the present embodiment, the EV value compensated for is not particularly limited to that for live view, and may be an EV value for capturing a still image and/or a moving image, for example.

In each of the above embodiments, the example in which the controller 135 sets, in the AE control processing, the electronic shutter based on the TV value (S7) is described. The present disclosure does not particularly limited thereto. In Step S7, the controller 135 may sets a shutter speed of a shutter of the optical system 110, that is, a mechanical shutter.

In each of the above embodiments, the example in which, in the AE control processing, the exposure compensation value is calculated (S3, S4) and the compensation for the exposure determined by multi-zone metering is performed by adding the exposure compensation value (S5) is described. In the present embodiment, the exposure compensation is not limited to the addition of the exposure compensation value, and may be performed by changing the weight of each of the areas 190 obtained, in the multi-zone metering mode as illustrated in FIG. 5, by dividing the captured image Im. In this case, in Steps S3 and S4 of FIG. 4 a compensation coefficient for multiplying the weight of each of the areas 190 may be calculated instead of the exposure compensation value, for example.

In each of the above embodiments, the controller 135 compares the feature values of the images to determine whether the subject of the stored subject information and the subject corresponding to the currently detected head region aye the same (S42) in the processing of face-priority exposure compensation (S3). In the present embodiment, in Step S42, the controller 135 may compare, between the head region of the subject information and the currently detected head region, a position and a size of the head region to determine that the subjects are the same subject when the positions and sizes are the same.

In each of the above embodiments, the subject information is stored (S23) when the face region is detected in the processing of face-priority exposure compensation (S3). In the present embodiment, the subject information may be updated for each frame by storing the subject information after the execution of Step S42 when the head region is detected (YES in S40) in addition to Step S23, for example. As a result, in Step S42, it may be determined, between two consecutive frames, whether the head region of the stored subject information and the detected head region correspond to the same subject.

In each of the above embodiments, the digital camera 100 in which the second detector is configured as the head recognizer 124 is described. In the present embodiment, the second detector is not limited to the head recognizer 124, and may be configured to realize a detection function of a subject such as the whole or a part of a human body by image recognition, for example.

In each of the above embodiments, the example of applying the face-priority function in the AE control of the multi-zone metering mode is described. The present disclosure is applicable when performing exposure compensation such as the face-priority function in various types of exposure control, without being limited to the AE control in the multi-zone metering mode.

In each of the above embodiments, the example in which metering, i.e. light metering or exposure metering, is performed using the luminance of the imaging data in AE control is described. The digital camera 100 of the present embodiment may include a photometric sensor, and perform metering by the photometric sensor.

In each of the above embodiments, the digital camera 100 including the optical system 110 and the lens driver is exemplified. The imaging apparatus of the present embodiment do not necessarily include the optical system 110 and the lens driver, and may be, an interchangeable lens type camera, for example.

In each of the above embodiments, the digital camera 100 is described as an example of the imaging apparatus, but the present disclosure is not limited thereto. The imaging apparatus of the present disclosure may be an electronic device (e.g., a video camera, a smartphone, a tablet computer, or the like) having an image capturing function capable of controlling exposure.

As described above, the above-described embodiments are described as examples of techniques in the present disclosure. To this extent, the attached drawings and detailed descriptions are provided.

Therefore, components described in the attached drawings and the detailed description include not only components indispensable to solve the problem, but may also include components not necessarily indispensable to solve the problem in order to provide examples of the techniques. Therefore, those components not necessarily indispensable should not be deemed essential due to the mere fact that those components not necessarily indispensable are described in the attached drawings and the detailed description.

The present disclosure is applicable to imaging apparatus having a function of detecting a subject and controlling exposure.

The invention claimed is:

1. An imaging apparatus comprising:
an imager that captures an image of a subject to generate image data;
a first detector that detects a face region corresponding to a face of the subject in the image data;
a second detector that detects a subject region matching a part or whole of the subject besides the face region in the image data; and
a controller that controls exposure based on metering for the image data,
wherein the controller
performs, when the face region is detected by the first detector, exposure compensation according to metering in the detected face region,
continues the exposure compensation according to the metering in the detected face region, when the detected face region is lost by the first detector and the subject region matching the subject of the detected face region is detected by the second detector, and
reduces the exposure compensation according to the metering in the detected face region in a case where the detected face region is lost by the first detector and the corresponding subject region is not detected by the second detector after the face region is detected by the first detector.

2. The imaging apparatus according to claim 1, wherein the second detector detects, as the subject region, a region matching a head of the subject.

3. The imaging apparatus according to claim 1, further comprising
a setting interface that allows activation or deactivation of an option valuing the face region preferentially in an operation mode regarding the metering,
wherein the controller performs the exposure compensation according to the metering in the detected face region when the option is activated by the setting interface.

4. The imaging apparatus according to claim 1, wherein the controller gradually reduces the exposure compensation according to the metering in the detected face region in a case where the detected face region is lost by the first detector and the corresponding subject region is not detected by the second detector after the face region is detected by the first detector.

5. The imaging apparatus according to claim 1, further comprising
a storage that stores information,
wherein the controller
calculates an exposure compensation value to perform the exposure compensation according to the metering in the detected face region and stores the calculated exposure compensation value in the storage when the face region is detected by the first detector, and
holds the exposure compensation value stored in the storage to continue the exposure compensation when the detected face region is lost by the first detector and the subject region matching the subject of the detected face region is detected by the second detector.

6. The imaging apparatus according to claim 5, wherein the controller
stores subject information in the storage when the face region is detected by the first detector, the subject information indicating the subject based on at least one of the face region and the subject region, and determines whether to hold the stored exposure compensation value, referring to the stored subject information, when the detected face region is lost by the first detector and the subject region is detected by the second detector.

7. The imaging apparatus according to claim 5, wherein the controller stores scene information in the storage when the face region is detected by the first detector, the scene information indicating brightness of a scene in the image data, and determines whether to hold the stored exposure compensation value, referring to the stored scene information, when the detected face region is lost by the first detector.

8. The imaging apparatus according to claim 2, further comprising a setting interface that allows activation or deactivation of an option valuing the face region preferentially in an operation mode regarding the metering, wherein the controller performs the exposure compensation according to the metering in the detected face region when the option is activated by the setting interface.

9. The imaging apparatus according to claim 2, wherein the controller gradually reduces the exposure compensation according to the metering in the detected face region in a case where the detected face region is lost by the first detector and the corresponding subject region is not detected by the second detector after the face region is detected by the first detector.

10. The imaging apparatus according to claim 3, wherein the controller gradually reduces the exposure compensation according to the metering in the detected face region in a case where the detected face region is lost by the first detector and the corresponding subject region is not detected by the second detector after the face region is detected by the first detector.

11. The imaging apparatus according to claim 2, further comprising a storage that stores information, wherein the controller calculates an exposure compensation value to perform the exposure compensation according to the metering in the detected face region and stores the calculated exposure compensation value in the storage when the face region is detected by the first detector, and holds the exposure compensation value stored in the storage to continue the exposure compensation when the detected face region is lost by the first detector and the subject region matching the subject of the detected face region is detected by the second detector.

12. The imaging apparatus according to claim 3, further comprising a storage that stores information, wherein the controller calculates an exposure compensation value to perform the exposure compensation according to the metering in the detected face region and stores the calculated exposure compensation value in the storage when the face region is detected by the first detector, and holds the exposure compensation value stored in the storage to continue the exposure compensation when the detected face region is lost by the first detector and the subject region matching the subject of the detected face region is detected by the second detector.

13. The imaging apparatus according to claim 4, further comprising a storage that stores information, wherein the controller calculates an exposure compensation value to perform the exposure compensation according to the metering in the detected face region and stores the calculated exposure compensation value in the storage when the face region is detected by the first detector, and holds the exposure compensation value stored in the storage to continue the exposure compensation when the detected face region is lost by the first detector and the subject region matching the subject of the detected face region is detected by the second detector.

14. The imaging apparatus according to claim 6, wherein the controller stores scene information in the storage when the face region is detected by the first detector, the scene information indicating brightness of a scene in the image data, and determines whether to hold the stored exposure compensation value, referring to the stored scene information, when the detected face region is lost by the first detector.

15. The imaging apparatus according to claim 1, wherein the controller discontinues the exposure compensation according to the metering in the detected face region, when the detected face region is lost by the first detector and the subject region matching the subject of the detected face region is not detected by the second detector.

* * * * *